United States Patent
Choi et al.

(10) Patent No.: US 9,906,889 B2
(45) Date of Patent: Feb. 27, 2018

(54) METHOD AND DEVICE FOR TRANSMITTING AND RECEIVING SYSTEM INFORMATION FROM A SYSTEM SUPPORTING MACHINE-TO-MACHINE COMMUNICATION

(71) Applicant: LG ELECTRONICS INC., Seoul (KR)

(72) Inventors: Jinsoo Choi, Anyang-si (KR); Hangyu Cho, Anyang-si (KR); Heejeong Cho, Anyang-si (KR); Jinsam Kwak, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 602 days.

(21) Appl. No.: 14/350,555

(22) PCT Filed: Oct. 15, 2012

(86) PCT No.: PCT/KR2012/008372
§ 371 (c)(1),
(2) Date: Apr. 8, 2014

(87) PCT Pub. No.: WO2013/055172
PCT Pub. Date: Apr. 18, 2013

(65) Prior Publication Data
US 2014/0286279 A1    Sep. 25, 2014

Related U.S. Application Data

(60) Provisional application No. 61/547,745, filed on Oct. 16, 2011, provisional application No. 61/547,037, filed on Oct. 14, 2011.

(51) Int. Cl.
*H04W 48/12* (2009.01)
*H04W 4/00* (2009.01)
(Continued)

(52) U.S. Cl.
CPC .......... *H04W 4/005* (2013.01); *H04W 48/12* (2013.01); *H04W 56/00* (2013.01); *H04W 72/12* (2013.01)

(58) Field of Classification Search
None
See application file for complete search history.

(56) References Cited

U.S. PATENT DOCUMENTS

2010/0226389 A1* 9/2010 Cho ..................... H04W 48/16 370/465
2011/0051848 A1* 3/2011 Yuk ..................... H04W 48/12 375/316
(Continued)

FOREIGN PATENT DOCUMENTS

KR    10-2011-0081724    7/2011

OTHER PUBLICATIONS

"802.16m-2011—IEEE Standard for Local and metropolitan area networks Part 16: Air Interface for Broadband Wireless Access Systems Amendment 3: Advanced Air Interface", May 6, 2011.*
(Continued)

*Primary Examiner* — Ayaz Sheikh
*Assistant Examiner* — Mariela Vidal Carpio
(74) *Attorney, Agent, or Firm* — Lee Hong Degerman Kang & Waimey

(57) ABSTRACT

The present invention relates to various methods and devices that receive and update system information that is used for machine-to-machine (M2M) communication in a wireless connection system supporting the machine-to-machine communication. As an embodiment of the present invention, the method of receiving system information on an M2M instrument from the wireless connection system supporting the M2M may include: receiving, at the M2M instrument, a first secondary superframe header subpacket (S-SFH SP 3) 3
(Continued)

message that includes information on a transmission period during which a second S-SFH SP 3 message including M2M-dedicated ranging information is transmitted; receiving, at the M2M instrument, the second S-SFH SP 3 message on the basis of the transmission period information; and receiving, at the M2M instrument, a system configuration descriptor message that includes updated system information, when the M2M-dedicated ranging information in the second S-SFH SP 3 shows that system information on M 2M is updated.

8 Claims, 5 Drawing Sheets

(51) Int. Cl.
*H04W 72/12* (2009.01)
*H04W 56/00* (2009.01)

(56) References Cited

U.S. PATENT DOCUMENTS

| | | | | |
|---|---|---|---|---|
| 2011/0090884 A1* | 4/2011 | Won | ................ | H04W 28/18 370/338 |
| 2011/0134896 A1* | 6/2011 | Venkatachalam | ..... | H04W 56/00 370/338 |
| 2011/0216700 A1* | 9/2011 | Moon | ............ | H04W 74/08 370/328 |
| 2011/0310761 A1* | 12/2011 | Lee | ................ | H04W 72/12 370/252 |
| 2012/0115518 A1* | 5/2012 | Zeira | ................ | H04W 8/005 455/500 |
| 2012/0284406 A1* | 11/2012 | Wang | ................ | H04W 48/14 709/225 |
| 2014/0003410 A1* | 1/2014 | Lee | ................ | H04W 74/00 370/338 |
| 2014/0056221 A1* | 2/2014 | Li | ................ | H04W 4/005 370/328 |
| 2014/0056229 A1* | 2/2014 | Li | ................ | H04W 8/186 370/329 |

OTHER PUBLICATIONS

Choi, et al., "Consideration on the Update Procedure of the System Information for M2M," IEEE 802.16 Presentation Submission Template (Rev. 9), IEEE C80216p-10/0023, Dec. 2010, 10 pages.

Choi, et al., "Consideration on the Update Procedure of the System Information for M2M," IEEE 802.16 Presentation Submission Template (Rev. 9), IEEE C80216p-10/0023r1, Jan. 2010, 10 pages.

Cha, et al., "Distribution of Initial Ranging Access for Network Reentry," IEEE 802.16 Broadband Wireless Access Working Group, IEEE C802.16p-11/0020, Mar. 2011, 16 pages.

Kim, et al., "Distribution of ranging access from M2M devices during network reentry in 16.1," IEEE 802.16 Broadband Wireless Access Working Group, IEEE C802.16p-11/0213, Sep. 2011, 5 pages.

PCT International Application No. PCT/KR2012/008372, Written Opinion of the International Searching Authority dated Feb. 15, 2013, 21 pages.

* cited by examiner

METHOD AND DEVICE FOR TRANSMITTING AND RECEIVING SYSTEM INFORMATION FROM A SYSTEM SUPPORTING MACHINE-TO-MACHINE COMMUNICATION

CROSS-REFERENCE TO RELATED APPLICATIONS

This application is the National Stage filing under 35 U.S.C. 371 of International Application No. PCT/KR2012/008372, filed on Oct. 15, 2012, which claims the benefit of U.S. Provisional Application Ser. Nos. 61/547,745, filed on Oct. 16, 2011 and 61/547,037, filed on Oct. 14, 2011, the contents of which are all hereby incorporated by reference herein in their entirety.

TECHNICAL FIELD

The present invention relates to a method of receiving and updating system information, which is used for a M2M (machine-to-machine) communication in a wireless access system supporting the M2M communication.

BACKGROUND ART

A machine-to-machine (hereinafter abbreviated M2M) communication environment of the present invention is briefly explained in the following.

A M2M communication literally means a communication between one electronic device and another electronic device. In a broad sense, the M2M communication may mean a wire/wireless communication between electronic devices or a communication between a human-controllable device and a machine. Recently, the M2M communication may generally indicate a communication performed between electronic devices without involvement of a human.

In the early 1990's, in which the concept of the M2M communication has been initially introduced, the M2M communication has been recognized as remote control or telematics and derivative markets of the M2M communication were very limitative. Yet, the M2M communication has grown rapidly for past few years and has been introduced into the globally noteworthy markets. Specifically, in POS (point of sales) and security related application markets, the M2M communication has considerable influence on such field as fleet management, remote monitoring of machinery and equipment, smart meter for auto-measurement of operating time, consumed heat or electricity quantity on construction machinery equipment and the like. M2M communication in the future will be further utilized for various usages in connection with small-scale output communication solutions for conventional mobile communication, wireless high-speed internet, Wi-Fi, ZigBee and the like and may lay the foundation of expansion to B2C (business to consumer) markets instead of being confined to B2B (business to business) markets.

In the era of the M2M communication, every machine equipped with SIM card enables data transmission and reception and is capable of remote management and control. For instance, as M2M communication technology is usable for numerous devices and equipments including vehicles, trucks, containers, auto-vending machines, gas tanks and the like, its application fields may reach far and wide.

DISCLOSURE OF THE INVENTION

Technical Tasks

M2M devices have a very simple structure. Unlike a legacy HTC (human type communication) mobile station, i.e., general mobile station, most of the M2M devices operate without a human involvement. In general, most of the M2M devices are installed in a fixed position and have low mobility. Hence, it is necessary to maintain the M2M devices for a long time without excessively consuming electricity.

Yet, as industries are developing, the M2M devices are introducing to a real life. Hence, an environment where the M2M devices and general mobile stations coexist within a single system will be growing.

Hence, unlike a ranging of a general mobile station, it is necessary to propose a method of performing an M2M device-dedicated ranging. In this case, it should consider various methods of supporting the M2M device-dedicated ranging together.

As mentioned in the foregoing description, the present invention is designed to satisfy requirements. One object of the present invention is to provide an efficient communication method for an M2M device.

Another object of the present invention is to provide a method of efficiently transmitting and receiving messages associated with system information to support an M2M device-dedicated ranging.

Another object of the present invention is to provide a method of changing system information on M2M devices only in an environment where a general mobile station and an M2M device coexist without affecting the general mobile station.

The other object of the present invention is to provide a device capable of supporting the aforementioned methods.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

The present invention provides various methods of receiving and updating system information, which is used for a M2M (machine-to-machine) communication in a wireless access system supporting the M2M communication.

To achieve these and other advantages and in accordance with the purpose of the present invention, as embodied and broadly described, according to one embodiment, a method of receiving system information on an M2M device in a wireless access system supporting machine-to-machine (M2M) communication includes the steps of receiving a first secondary superframe header subpacket3 (S-SFH SP3) message, which is received by the M2M device, including transmission period information of a second S-SFH SP3 message including M2M dedicated ranging information, receiving the second S-SFH SP3 message, which is received by the M2M device based on the transmission period information, and if the M2M dedicated ranging information included in the second S-SFH SP3 message indicates that the system information on the M2M device is updated, receiving a system configuration descriptor message including the updated system information by the M2M device.

To further achieve these and other advantages and in accordance with the purpose of the present invention, according to a different embodiment, an M2M device for receiving system information on the M2M device in a wireless access system supporting machine-to-machine (M2M) communication can include a radio frequency (RF) module and a processor configured to control reception of the system information.

In this case, the processor is configured to control the RF module to receive a first secondary superframe header subpacket3 (S-SFH SP3) message, which includes transmission period information of a second S-SFH SP3 message including M2M dedicated ranging information, the processor is configured to receive the second S-SFH SP3 message based on the transmission period information, if the M2M dedicated ranging information included in the second S-SFH SP3 message indicates that the system information on the M2M device is updated, the processor is configured to control the RF module to receive a system configuration descriptor message including the updated system information.

According to embodiments of the present invention, the transmission period information can include a field of periodicity of M2M dedicated ranging indicating a transmission period of the second S-SFH SP3 message.

In this case, the transmission period information can further include an S-SFH change cycle field indicating a period of changing content included in an S-SFH and the field of periodicity of M2M dedicated ranging can indicate the transmission period of the second S-SFH SP3 message based on the S-SFH change cycle field.

Or, the transmission period information may indicate the transmission period of the second S-SFH SP3 message on the basis of a superframe in which the first S-SFH SP3 message is received.

To further achieve these and other advantages and in accordance with the purpose of the present invention, according to a further different embodiment, a method of receiving system information on an M2M device in a wireless access system supporting machine-to-machine (M2M) communication includes the steps of receiving a primary superframe header (P-SFH) message, which is received by the M2M device, including an M2M dedicated ranging indicator indicating whether M2M dedicated ranging information included in a secondary superframe header subpacket3 (S-SFH SP3) is updated, if the M2M dedicated ranging indicator indicates that the M2M dedicated ranging information is updated, receiving the S-SFH SP3 message during an S-SFH change cycle in which the P-SFH message is received, if the M2M dedicated ranging information included in the S-SFH SP3 message indicates that the system information on the M2M device is updated, receiving a system configuration descriptor message including the updated system information including the updated system information by the M2M device.

To further achieve these and other advantages and in accordance with the purpose of the present invention, according to a further different embodiment, an M2M device for receiving system information on the M2M device in a wireless access system supporting machine-to-machine (M2M) communication includes a radio frequency (RF) module and a processor configured to control reception of the system information.

In this case, the processor is configured to control the RF module to receive a primary superframe header (P-SFH) message including an M2M dedicated ranging indicator, which indicates whether M2M dedicated ranging information included in a secondary superframe header subpacket3 (S-SFH SP3) is updated, if the M2M dedicated ranging indicator indicates that the M2M dedicated ranging information is updated, the processor is configured to receive the S-SFH SP3 message during an S-SFH change cycle in which the P-SFH message is received, if the M2M dedicated ranging information included in the S-SFH SP3 message indicates that the system information on the M2M device is updated, the processor is configured to control the RF module to receive a system configuration descriptor message including the updated system information, which includes the updated system information.

According to further different embodiments of the present invention, the P-SFH message can be received in every superframe.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, it is able to provide an efficient communication method for an M2M device in an environment where a general mobile station and the M2M device coexist.

Secondly, it is able to support an M2M device-dedicated ranging without affecting the general mobile station.

Thirdly, it is able to change system information on M2M devices only in an environment where a general mobile station and an M2M device coexist without affecting the general mobile station.

Fourthly, it is able to reduce power consumption in a manner that M2M devices decode an S-SFH SP3 (secondary super frame header sub-packet 3) with a specific period or in a specific superframe instead of decoding the S-SFH SP3 message in all superframes.

Fifthly, it is able to minimize an impact on an operation of a general mobile station and reduce power consumption in an environment where a general mobile station and an M2M device coexist.

Additional advantages, objects, and characteristics of the present invention can be clearly understood in a manner that those skilled in the art implement the present invention based on the following description. Moreover, the present invention may have an unexpected advantage while those skilled in the art implement the present invention based on the following description.

DESCRIPTION OF DRAWINGS

The accompanying drawings, which are included to provide a further understanding of the invention, provide embodiments of the present invention together with detailed explanation. A technical characteristic of the present invention may be non-limited by a specific drawing. A new embodiment can be configured by combining characteristics disclosed in each drawing with each other.

BEST MODE

Mode for Invention

Figure 1:
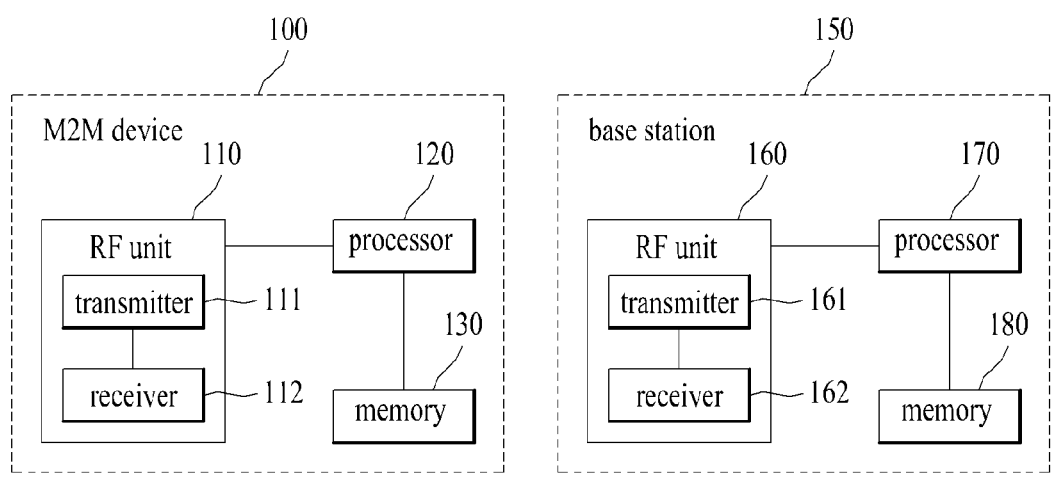
FIG. 1 is a schematic diagram for explaining a configuration of such a device as an M2M device, a base station, and the like according to embodiment of the present invention.

Embodiments of the present invention provide a method of broadcasting a MAC (medium access control) message in a wireless access system supporting M2M environment and an apparatus therefor.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Procedures or steps probably making the point of the present invention unclear are skipped and procedures or steps understandable by those skilled in the art are also skipped as well.

In the present specification, the embodiments of the present invention are explained in a manner of mainly concerning data transmission and reception between a base station and a mobile station. In this case, the base station has a meaning of a terminal node of a network performing a direct communication with the mobile station. In the present disclosure, a specific operation, which is explained as performed by the base station, may be performed by an upper node of the base station in some cases.

In particular, in a network constructed with a plurality of network nodes including a base station, it is apparent that various operations performed for communication with a mobile station can be performed by the base station or other networks except the base station. 'Base station (BS)' may be substituted with such a terminology as a fixed station, a Node B, an eNode B (eNB), an advanced base station (ABS), an access point (AP) and the like.

And, a mobile station (MS) may be substituted with such a terminology as a user equipment (UE), a subscriber station (SS), a mobile station subscriber station (MSS), a mobile terminal (MT), an advanced mobile station (AMS), a terminal, and the like. In particular, a mobile station may be used as a meaning identical to an M2M device in the present invention.

And, a transmitting end corresponds to a fixed and/or mobile node providing a data service or an audio service and a receiving end corresponds to a fixed and/or mobile node receiving the data service or the audio service. Hence, a mobile station becomes the transmitting end and a base station may become the receiving end in uplink. In the same manner, the mobile station becomes the receiving end and the base station may become the transmitting end in downlink.

The embodiments of the present invention can be supported by standard documents disclosed in at least one of IEEE 80.22.xx system, 3GPP system, 3GPP LTE system, and 3GPP2 system. In particular, unmentioned clear steps or parts of the embodiments of the present invention can be explained with reference to the aforementioned standard documents.

And, all terminologies disclosed in the present specification can be explained by the aforementioned standard document. In particular, embodiments of the present invention can be supported by at least one of a standard document of IEEE 802.16 including P802.16e-2004, P802.16e-2005, P802.16m, P802.16p, and P802.16.1b.

In the following, preferred embodiment according to the present invention is explained in detail with reference to attached drawings. Detailed description disclosed together with the accompanying drawings is intended to explain not a unique embodiment of the present invention but an exemplary embodiment of the present invention.

Embodiments of the present invention is explained in detail with reference to the attached drawings to make those having ordinary knowledge in a technical field to which the present invention belongs thereto easily implement the embodiments of the present invention. The present invention can be implemented in various ways and may be non-limited by the embodiments explained in the following. In order to precisely explain the present invention, the same reference numbers will be used throughout the drawings to refer to the same or like parts in this specification irrespective of the sign of the drawings and the overlapped explanation on the corresponding content can be omitted.

In the present application, such a terminology as 'include' and the like should be construed not as excluding a different component but as further including the different component unless there is a special citation. And, in the present specification, such a terminology as ' . . . unit', ' . . . device', 'module' or the like means a unit for processing at least one function or an operation and can be implemented by a hardware, a software, or a combination thereof.

Moreover, specific terminologies used in the embodiments of the present invention are provided to help understanding of the present invention and the use of the specific terminologies can be modified in a different form in a scope without departing from the technical idea of the present invention.

1. General of M2M Device

In the following description, an M2M communication may mean a communication form performed between mobile stations via a base station, between a base station and each of mobile stations without human involvement, or between M2M devices. Hence, the M2M device may mean a mobile station capable of supporting the above-mentioned M2M device communication.

An access service network for an M2M service may be defined as an M2M ASN (M2M access service network) and a network entity performing communications with M2M devices may be named an M2M server. In particular, the M2M server performs an M2M application and provides an M2M-specific service for one or more M2M devices. An M2M feature indicates a feature of an M2M application. And, at least one feature may be necessary to provide an application. An M2M device group may mean a group of M2M devices that share one or more common features with each other.

The devices performing communications by M2M scheme may be variously named M2M devices, M2M communication devices, MTC (machine type communication) devices and the like. And, the number of the devices performing communications by the M2M scheme will gradually increase as the number of machine application type increases in a prescribed network.

The machine application type may include (1) security, (2) public safety, (3) tracking and tracing, (4) payment, (5) healthcare, (6) remote maintenance and control, (7) metering, (8) consumer device, (9) POS (Point Of Sales) and Fleet Management in a security related application market, (10) M2M communication of vending machine (11) smart meter for plant and machinery remote monitoring, operating time measurement on measurement on construction plant and machinery and auto-measurement of consumed heat or electricity quantity on construction plant and machinery, (12) surveillance video communication and the like, by which the machine application type may be non-limited. And, other machine application types can be applied.

According to other properties of an M2M device, the M2M device may have low mobility or no mobility when the M2M device is installed. It means that the corresponding M2M device is stationary for a considerably long time. An M2M communication system may be able to simplify or optimize mobility-related operations used for a specific M2M application related to such an M2M device having a stationary location as an M2M device for secured access and surveillance, an M2M device for public safety, an M2M device for payment, an M2M device for remote maintenance and control, an M2M device for metering and the like.

As mentioned earlier in the foregoing description, the number of M2M communication devices may rapidly increase compared to the number of general mobile communication devices as the number of the machine application type increases. Hence, in case that all of the M2M communication devices individually perform a communication with a base station, serious overhead can be given to a wireless interface and/or a network.

In the following description, an embodiment of the present invention is explained with reference to a case of applying an M2M communication to a wireless communication system (e.g., IEEE 802.16e, P802.16m, P802.16.1b, P802.16p etc.), by which the present invention may be non-limited. And, the embodiment of the present invention is applicable to such a different wireless communication system as 3GPP LTE/LTE-A system and the like in the same manner.

FIG. 1 is a schematic diagram for explaining a configuration of such a device as an M2M device, a base station, and the like according to embodiment of the present invention.

Referring to FIG. 1, an M2M device 100 may include an RF unit 110, a processor 120 and a memory 130. In this case, the memory 130 is an optional component. And, a base station 150 may include an RF unit 160, a processor 170 and a memory 180. In this case, the memory 180 is an optional component. Although FIG. 1 shows a configuration including one M2M device and one base station, an M2M communication environment can be constructed between a plurality of M2M devices and the base station.

Each of the RF units 110/160 may include a transmitter 111/161 and a receiver 112/162, respectively. The transmitter 111 and the receiver 112 of the M2M device 100 are configured to transceive a signal with the base station 150 and other M2M devices. The processor 120 can be configured to control the transmitter 111 and the receiver 112 to transceive a signal with other devices in a manner of being functionally connected with the transmitter 111 and the receiver 112. And, the processor 120 performs various processing on a signal to be transmitted, transmits the processed signal to the transmitter 111 and performs a processing on a signal received by the receiver 112.

If necessary, the processor 120 may store information included in an exchanged message in the memory 130. With the aforementioned structure, the M2M device 100 can perform various embodiments of the present invention described in the following.

Meanwhile, although it is not depicted in FIG. 1, the M2M device 100 can include various additional components according to a machine application type of the M2M device. For instance, if the M2M device 100 is provided for the smart meter, the M2M device 100 may further include an additional configuration for power measurement and the like. An operation of the power measurement may be controlled by the processor 120 shown in FIG. 1 or a separately configured processor (not depicted).

Although FIG. 1 shows an example that a communication is performed between the M2M device 100 and the base station 150, an M2M communication method according to the present invention may be performed between one or more M2M devices as well. In particular, each of the M2M devices may have the same device configurations shown in FIG. 1 and can perform a method according to various embodiments of the present invention described in the following.

The transmitter 161 and the receiver 162 of the base station 150 are configured to transceive a signal with a different base station, an M2M server, and M2M devices. The processor 170 can be configured to control the transmitter 161 and the receiver 162 to transceive a signal with other devices in a manner of being functionally connected with the transmitter 161 and the receiver 162. And, the processor 170 performs various processing on a signal to be transmitted, transmits the processed signal to the transmitter 161 and performs a processing on a signal received by the receiver 162. If necessary, the processor 170 may store information included in an exchanged message in the memory 130. With the aforementioned structure, the base station 150 can perform various embodiments of the present invention mentioned in the foregoing description.

The processor 120 of the M2M device 100 directs operations (e.g., control, adjustment, management, etc.) in the M2M device 100. The processor 170 of the base station 150 directs operations (e.g., control, adjustment, management, etc.) in the base station 150. The processor 120/170 may be connected to the memory 130/180 configured to store program codes and data. The memory 130/180 is connected to the processor 120/170 and stores operating systems, applications and general files.

The processor 120/170 of the present invention may be named one of a controller, a microcontroller, a microprocessor, a microcomputer and the like. Moreover, the processor 120/170 may be implemented by hardware, firmware, software or a combination thereof. In case of implementing an embodiment of the present invention using hardware, the processor 120/170 may be provided with such a configuration configured to perform the present invention as ASICs (application specific integrated circuits), DSPs (digital signal processors), DSPDs (digital signal processing devices), PLDs (programmable logic devices), FPGAs (field programmable gate arrays), and the like.

In case of implementing embodiments of the present invention using firmware or software, the firmware or software may be configured to include modules, procedures, and/or functions for performing the functions or operations of the present invention. And, the firmware or software configured to perform the present invention may be driven by the processor 120/170 in a manner of being installed in the processor 120/170 or being stored in the memory 130/180.

2. System Information

In a wireless access system, a base station periodically transmits an SFH (superframe header) including system information to a general mobile station and/or an M2M device. The SFH includes a P-SFH (primary SFH) and an S-SFH (secondary SFH). In this case, the P-SFH is transmitted in every superframe and a transmission period of the S-SFH may vary depending on a type of the S-SFH.

2.1 P-SFH

The P-SFH includes essential system information. The system information included in the P-SFH may include an S-SFH change count field, an S-SFH scheduling information field, an S-SFH SP change bitmap field, and the like. In this case, the S-SFH change count field indicates a value of the S-SFH change count field associated with S-SFH SPx IE, the S-SFH scheduling information field indicates a type of the S-SFH included in a corresponding superframe, and the S-SFH SP change bitmap field indicates whether there is a change of the S-SFH SPx IE between a current SFH and a previous SFH.

2.2 S-SFH

The S-SFH includes essential system information and system configuration information. The S-SFH can be divided into three types including S-SFH SP1, S-SFH SP2, and S-SFH SP3. The three types of the S-SFH SPx are transmitted on timings different from each other with periods different from each other. For instance, a transmission period of the S-SFH SPx can be represented as 'SP1<SP2<SP3'.

Following Table 1 indicates an example of an S-SFH SP3 information element (IE) which is applied to embodiments of the present invention.

TABLE 1

| syntax | Size (bit) | description |
|---|---|---|
| . . . | . . . | . . . |
| SCD Count | 4 | This value indicates CCC associated with system configuration of AAI-SCD for a general mobile station |
| . . . | . . . | . . . |
| M2M SCD Count | 4 | Whenever content of information on M2M device-dedicated ranging is changed, this value increases. This value varies between 0~15. In particular, this value indicates CCC associated with system configuration of AAI-SCD for an M2M device. |
| Multiplexing factor of dedicated ranging code | 3 | This value indicates multiplexing ratio of a dedicated ranging code. 0b001:1 0b001:1/2 0b001:1/4 0b001:1/8 0b001:1/16 0b001:1/32 0b001:1/64 0b001:1/128 |
| . . . | . . . | . . . |

Referring to Table 1, the S-SFH SP3 is system information and can include an SCD count field, an M2M SCD count field, and a multiplexing factor of a dedicated ranging code field. The SCD count field indicates a CCC (configuration change count) associated with system configuration of an AAI-SCD (AAI-system configuration descriptor) for a general mobile station and an M2M SCD count field indicates an CCC (configuration change count) associated with system configuration of an AAI-SCD (AAI-system configuration descriptor) for am M2M device. And, a multiplexing factor field of a dedicated ranging code indicates a ratio of the dedicated ranging code.

2.3 AAI-SCD

An AAI-SCD (AAI-system configuration descriptor) message is periodically transmitted from a base station to define a system configuration. A CCC (configuration change count) included in the AAI-SCD message increases whenever content of the AAI-SCD message is changed. If the content of the AAI-SCD is changed, the base station indicates the change of the AAI-SCD message using S-SFH-related fields included in the P-SFH and an SCD count in the S-SFH SP3 message.

After transmitting the S-SFH SP3 message including the SCD count field, which has a value identical to the CCC field included in the AAI-SCD message, if the system configuration of the AAI-SCD message associated with the SCD count of the S-SFH SP3 is changed, the base station transmits the S-SFH SP3 message by updating the SCD count. Subsequently, a mobile station receives the S-SFH SP3. If the mobile station recognizes that the SCD count is different from the previous SCD count, the mobile station can obtain information on the changed system configuration by receiving a next AAI-SCD message transmitted by the base station.

3. Method of Transmitting and Receiving S-SFH

In the following, methods for M2M devices to perform a dedicated ranging are explained in a manner of proposing a method of efficiently managing an M2M SCD count field included in an S-SFH SP3 message.

Figure 2:
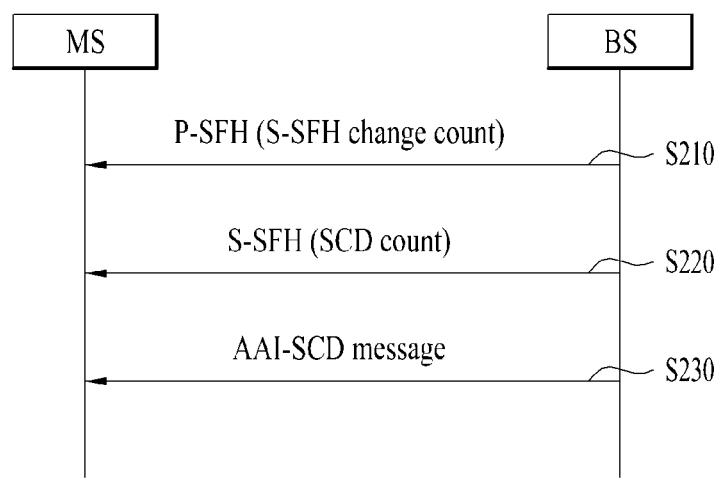
FIG. 2 is a flowchart for a method for a base station to transceive an S-SFH message with a general mobile station.

FIG. 2 is a flowchart for a method for a base station to transceive an S-SFH message with a general mobile station.

In the following, in case that information on system configuration is changed, a method of transceiving an S-SFH SP3 message with general mobile terminals is explained in order for a base station to transmit an AAI-SCD message including changed content of the system configuration. For the explanation on the P-SFH and the S-SFH, refer to the content described in the second passage.

The base station transmits the P-SFH in a first subframe of a first frame of every superframe. In this case, if content of the S-SFH SP3 is changed, the base station transmits the P-SFH including an updated S-SFH change count field [S210].

And, if information on the system configuration included in the AAI-SCH message is changed, the base station transmits the S-SFH SP3 message including an updated SCD count to the mobile station [S220].

Having received the S-SFH SP3 message, the mobile station decodes an SCD count field included in the S-SFH SP3 message and then compares an SCD count decoded from the SCD count field with a previous SCD count stored in the mobile station. If a value of the SCD count field included in the S-SFH SP3 is different from a value of the SCD count field stored in the mobile station, the mobile station recognizes it as the information on the system configuration included in the AAI-SCD message has changed and receives the AAI-SCD message transmitted from the base station [S230].

The content explained in FIG. 2 relates to a method of transmitting and receiving the S-SFH SP3 message. The method is performed in case that system information is changed between a general mobile station and a base station in a cellular system.

Figure 3:
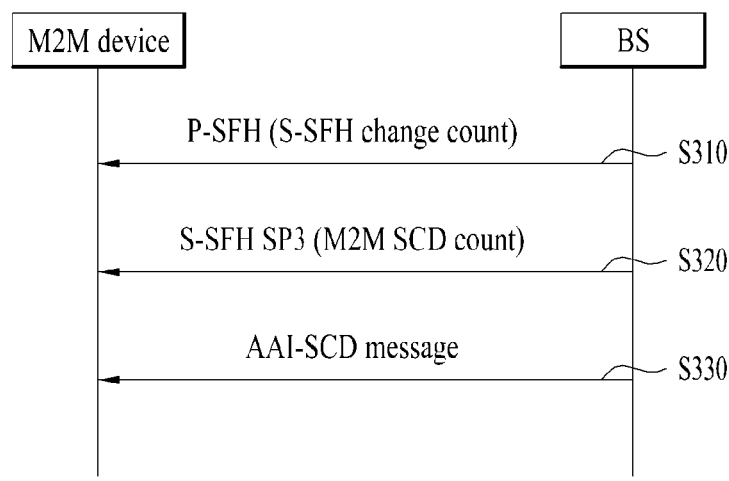
FIG. 3 is a flowchart for a method for M2M devices to transceive an S-SFH message with a base station.

FIG. 3 is a flowchart for a method for M2M devices to transceive an S-SFH message with a base station.

In the following, in case that information on system configuration is changed, a method of transceiving an S-SFH SP3 message with M2M devices is explained in order for a base station to transmit an AAI-SCD message including changed content of the system configuration. For the explanation on the P-SFH and the S-SFH, refer to the content described in the second passage.

The base station transmits the P-SFH in a first subframe of a first frame of every superframe. In this case, if content of the S-SFH SP3 is changed, the base station transmits the P-SFH including an updated S-SFH change count field [S310].

And, if information on the system configuration of the M2M devices included in the AAI-SCH message is changed, the base station transmits the S-SFH SP3 message including an updated SCD count to the M2M devices [S320].

Having received the S-SFH SP3 message, the M2M device decodes an M2M SCD count field included in the S-SFH SP3 message and then compares an M2M SCD count decoded from the M2M SCD count field with a previous M2M SCD count stored in the M2M device. If a value of the M2M SCD count field included in the S-SFH SP3 is different from a value of the M2M SCD count field stored in the M2M device, the M2M device recognizes it as the information on the system configuration included in the AAI-SCD message has changed and receives the AAI-SCD message transmitted from the base station [S330].

Referring to FIG. 3, the M2M devices receive the S-SFH SP3 and may decode S-SFH SP3 when an M2M SCD count field is changed only. Yet, since the M2M devices do not always decode the S-SFH SP3 with extremely low power consumption depending on a type (e.g., sensor device) of the M2M devices, it is unable to precisely know when the M2M SCD count, which is updated by updating M2M device-dedicated ranging information, is updated.

The method of FIG. 2 and the method of FIG. 3 are applied to the general mobile station and the M2M device, respectively, in the environment that the general mobile station and the M2M device coexist. Hence, in order to efficiently manage the M2M SCD count field, the M2M devices should decode the S-SFH SP3 all the time. This is because the S-SFH change count field and the S-SFH change bitmap field of the P-SFH operate to manage legacy general mobile stations only irrespective of operations of the M2M devices.

Figure 4:
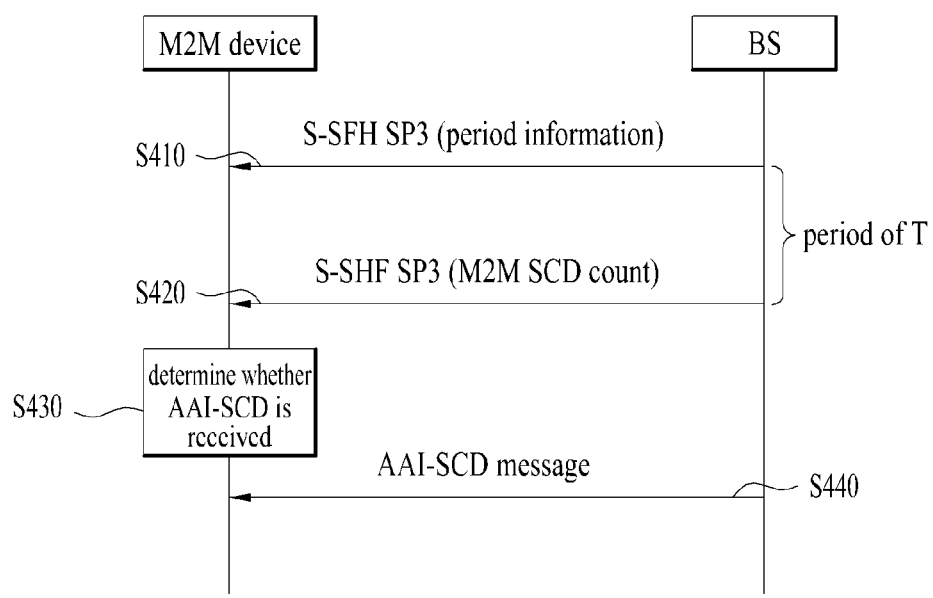
FIG. 4 is a flowchart for a method for M2M devices to update system information according to embodiment of the present invention.

FIG. 4 is a flowchart for a method for M2M devices to update system information according to embodiment of the present invention.

In order for the M2M devices to decode dedicated ranging information (e.g., M2M SCD counter field) on an M2M device included in the S-SFH SP3 message, the base station can transmit the S-SFH SP3 message with a specific period.

Referring to FIG. 4, in order to transmit the S-SFH SP3 message with the specific period, the base station can include a periodicity of M2M dedicated ranging field in the S-SFH SP3 message [S410].

In particular, the M2M device obtains M2M SCD count information on the basis of an S-SFH SP3 change period to which a most lastly received or a most recently received (i.e., initial network entering stage) S-SFH SP3 message belongs and may be then able to determine a decoding timing of the S-SFH SP3.

Following Table 2 indicates an example of a new S-SFH SP3 format applicable to embodiments of the present invention.

TABLE 2

| Syntax | Size (bit) | description |
|---|---|---|
| ... | ... | ... |
| S-SFH change cycle | 3 | This value indicates minimum interval where content of S-SFH is identically maintained. 0b000: 16 superframes 0b001: 32 superframes 0b010: 64 superframes 0b011~0b111: reserved |
| ... | ... | ... |
| Periodicity of M2M dedicated ranging (M2M SCD count) | 3 | This value indicates a cycle for M2M device to decode S-SFH SP3 including M2M dedicated ranging information (M2M SCD count). 0b000: 1 S-SFH change cycle 0b001: 2 S-SFH change cycle 0b010: 4 S-SFH change cycle 0b011: 8 S-SFH change cycle 0b100~0b111: reserved |
| ... | ... | ... |

Referring to Table 2, the S-SFH SP3 message may include an S-SFH change cycle field and a field of a periodicity of M2M dedicated ranging as period information.

The S-SFH change cycle field indicates minimum interval where content of S-SFH is identically maintained. For instance, if the S-SFH change cycle field is set to 0b000, the content is identically maintained for 16 superframes, if the S-SFH change cycle field is set to 0b001, the content is identically maintained for 32 superframes, and if the S-SFH change cycle field is set to 0b010, the content is identically maintained for 64 superframes. Hence, the M2M device does not need to decode the S-SFH message SP3 again during the interval by which the S-SFH change cycle field indicates.

If the field of periodicity of M2M dedicated ranging is set to 0b000, a cycle for the M2M device to decode the S-SFH SP3 message corresponds to 1 S-SFH change cycle, if the field of periodicity of M2M dedicated ranging is set to 0b001, a cycle for the M2M device to decode the S-SFH SP3 message corresponds to 2 S-SFH change cycles, if the field of periodicity of M2M dedicated ranging is set to 0b010, a cycle for the M2M device to decode the S-SFH SP3 message corresponds to 4 S-SFH change cycles, and if the field of periodicity of M2M dedicated ranging is set to 0b011, a cycle for the M2M device to decode the S-SFH SP3 message corresponds to 8 S-SFH change cycles.

As another aspect of the present invention, a decoding timing of the S-SFH SP3 message capable of decoding a next M2M SCD count field can be informed on the basis of a superframe to which a most recently received S-SFH SP3 message belongs instead of the S-SFH change cycle. Following Table 3 indicates a different example of a new S-SFH SP3 format applicable to the embodiments of the present invention.

TABLE 3

| syntax | size (bit) | description |
|---|---|---|
| ... | ... | ... |
| Periodicity of M2M dedicated ranging (M2M SCD count) | 3 | This value indicates a period for M2M device to decode S-SFH SP3 including M2M dedicated ranging information (M2M SCD count). 0b000: 16 superframes 0b001: 32 superframes 0b010: 64 superframes 0b011~0b111: reserved |
| ... | ... | ... |

Referring to Table 3, the S-SFH SP3 message may include a field of periodicity of M2M dedicated ranging as period information.

If the field of periodicity of M2M dedicated ranging is set to 0b000, it indicates that the S-SFH SP3 message is transmitted with a 16-superframe period, if the field of periodicity of M2M dedicated ranging is set to 0b001, it indicates that the S-SFH SP3 message is transmitted with a 32-superframe period, and if the field of periodicity of M2M dedicated ranging is set to 0b010, it indicates that the S-SFH SP3 message is transmitted with a 64-superframe period.

Hence, the M2M device can receive the S-SFH SP3 message in a period indicated by the field of periodicity of M2M dedicated ranging on the basis of a superframe (i.e., superframe in which the step S410 is performed) in which the S-SFH SP3 message is recently received.

Referring back to FIG. 4, the M2M device decodes period information included in the S-SFH SP3 and may be then able to receive the S-SFH SP3 message in which the M2M SCD count or the M2M dedicated ranging information is updated in a period of T [S420].

And, the M2M device can determine whether the AAI-SCD message is received by decoding the M2M SCD count information or the M2M dedicated ranging information [S430].

If the M2M count information or the M2M dedicated ranging information is updated, the M2M device can receive the AAI-SCD message to obtain updated system configuration information [S440].

Hence, the M2M device can decode the S-SFH SP3 message only in which system configuration information on the M2M device is changed in a manner of decoding the S-SFH change cycle field and the field of periodicity of M2M dedicated ranging shown in Table 2 or the field of periodicity of M2M dedicated ranging shown in Table 3.

In particular, the M2M device does not need to decode all of the S-SFH SP3 messages in a situation that a general mobile station and the M2M device coexist and may decode the S-SFH SP3 message in a period which is determined based on the field of periodicity of M2M dedicated ranging only. By doing so, it is able to minimize an impact on an operation of the general mobile station and reduce power consumption of the M2M device in the situation that the general mobile station and the M2M device coexist.

As a different aspect of the present invention, it is able to identically configure a period of updating the M2M SCD count in accordance with a period of decoding the S-SFH SP3 of the M2M device. For instance, the period of decoding the S-SFH SP3 of the M2M device can be independently configured irrespective of the period of actually updating the M2M SCD count (refer to Table 2 and Table 3). Yet, it is able to configure the period of updating the M2M SCD count and the period of decoding the S-SFH SP3 decoded by the M2M device to be identical to each other in consideration of operation efficiency of the M2M device.

In particular, allocation of the dedicated ranging information, which is allocated to all M2M devices via the AAI-SCD message for the M2M devices, is applied based on period information configured by a system via the S-SFH SP3. A process of decoding and updating the dedicated ranging information processed by the M2M device can be performed based on the configured period information.

Figure 5:
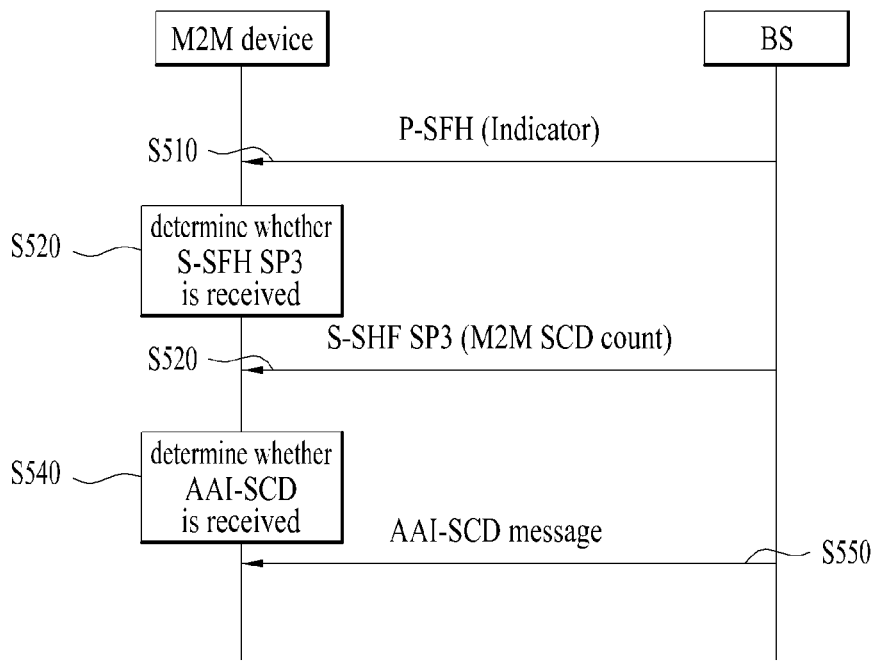
FIG. 5 is a flowchart for a different method for M2M devices to update system information according to embodiment of the present invention.

FIG. 5 is a flowchart for a different method for M2M devices to update system information according to embodiment of the present invention.

Referring to FIG. 5, the base station can transmit P-SFH in a manner of including a 1-bit indicator in the P-SFH to indicate the S-SFH SP3 message in which the M2M dedicated ranging information (e.g., M2M SCD count field) is updated [S510].

Following Table 4 indicates an example of a P-SFH message format applicable to the embodiments of the present invention.

TABLE 4

| syntax | size (bit) | description |
|---|---|---|
| ... | ... | ... |
| M2M dedicated ranging indicator | 1 | This value indicates whether M2M dedicated ranging information included in S-SFH SP3 is updated. 0b0: updated 0b1: not updated |
| ... | ... | ... |

Referring to FIG. 4, an M2M dedicated ranging indicator indicates whether the M2M dedicated ranging information (e.g., M2M SCD counter) included in the S-SFH SP3 is updated. For instance, if the M2M dedicated ranging indicator is set to 0b0, it indicates the M2M dedicated ranging information is updated and if the M2M dedicated ranging indicator is set to 0b1, it indicates the M2M dedicated ranging information is not updated.

The M2M devices should decode the P-SFH message in every superframe. Hence, the M2M devices decode an M2M dedicated ranging indicator field included in the P-SFH message. If the M2M dedicated ranging indicator field is set to 0b0, the M2M devices can receive an updated S-SFH SP3 message, which is updated during the S-SFH change cycle in which the corresponding P-SFH is received.

Referring back to FIG. 5, the M2M device can check whether the M2M dedicated ranging information is updated based on the M2M dedicated ranging indicator field. In particular, if the M2M dedicated ranging indicator field is set to 0b0, the M2M devices can determine whether to receive the updated S-SFH SP3 message [S520].

In the step S520, in case that the M2M device has determined to receive the S-SFH SP3 message, the M2M device can receive the S-SFH SP3 message including the M2M SCD count, which is updated during the S-SFH change cycle in which the P-SFH message is received [S530].

And, the M2M device can determine whether a value of the M2M SCD count included in the S-SFH SP3 message is identical to a value of the M2M SCD stored in the M2M device. If the value of the M2M SCD count included in the S-SFH SP3 message is different from the value of the M2M SCD stored in the M2M device, the M2M device determines that system configuration information included in the AAI-SCD message has changed. Hence, the M2M device can obtain changed system configuration information by receiving the AAI-SCD message [S550].

In FIG. 5, legacy general mobile stations may operate according to a method defined by IEEE 802.16m system while ignoring the M2M dedicated ranging indicator field included in the P-SFH message.

Hence, the M2M device does not need to decode all of the S-SFH SP3 messages in a situation that a general mobile station and the M2M device coexist. The M2M device can decode the S-SFH SP3 message in a superframe indicated by the M2M dedicated ranging indicator field only. By doing so, it is able to minimize an impact on an operation of the general mobile station and reduce power consumption of the M2M device in the situation that the general mobile station and the M2M device coexist.

The present invention can be implemented in a specific form without departing from the spirit or scope of the present invention. Hence, the aforementioned detailed description should be comprehended as not a unique embodiment of the present invention but an exemplary embodiment of the present invention in all aspects. Thus, it is intended that the present invention covers the modifications and variations of this invention provided they come within the scope of the appended claims and their equivalents. And, it is apparently understandable that a new embodiment may be configured by combining claims failing to have relation of explicit citation in the appended claims together or may be included as new claims by amendment after filing an application.

INDUSTRIAL APPLICABILITY

Embodiments of the present invention are applicable to various wireless access systems. As an example, a wireless access system may include 3GPP ($3^{rd}$ Generation Partnership Project), 3GPP2, and/or IEEE 802.xx (institute of Electrical and Electronic Engineers 802) system and the like. The embodiments of the present invention can be applied to a technical field to which the various wireless access systems are applied as well as the aforementioned various wireless access systems.

What is claimed is:

1. A method of receiving system information on a machine-to-machine (M2M) device in a wireless access system supporting M2M communication, the method comprising:

receiving, by the M2M device, a first secondary superframe header subpacket3 (S-SFH SP3) message, wherein the first S-SFH SP3 message comprises a system configuration descriptor (SCD) count field indicating a first configuration change count (CCC) associated with system configuration of an Advanced Air Interface (AAI)-SCD for a general mobile station other than the M2M device and an M2M SCD count field indicating a second CCC associated with system configuration of an AAI-SCD for the M2M device, wherein the first S-SFH SP3 message comprises a S-SFH change cycle field indicating a minimum interval where content of a S-SFH is maintained and a periodicity of a M2M dedicated ranging field corresponding to two or more S-SFH change cycles;

receiving and decoding, by the M2M device, a second S-SFH SP3 message among a plurality of transmitted S-SFH SP3 messages at only a time position determined based on periodicity information indicated by the periodicity of the M2M dedicated ranging field; and when a M2M SCD count field contained in the second S-SFH SP3 message indicates that the system information on the M2M device is updated, receiving and decoding, by the M2M device, a AAI-SCD message containing the updated system information for the M2M device.

2. The method of claim 1, wherein the periodicity information indicates the transmission period of the second S-SFH SP3 message on the basis of a superframe in which the first S-SFH SP3 message is received.

3. A method of receiving system information on a machine-to-machine (M2M) device in a wireless access system supporting M2M communication, the method comprising:

receiving, by the M2M device, a primary superframe header (P-SFH) message, wherein the P-SFH message comprises an M2M dedicated ranging indicator indicating whether a M2M system configuration descriptor (SCD) count field contained in a first secondary superframe header subpacket3 (S-SFH SP3) message is updated and a S-SFH change bitmap field indicating whether there is a change between the first S SFH SP3 message and a second S SFH SP3 message which was previously transmitted, wherein the S-SFH change bitmap field is not used by the M2M device;

when the M2M dedicated ranging indicator indicates that the M2M SCD count field is updated, receiving and decoding, by the M2M device, the first S-SFH SP3 message during an S-SFH change cycle in which the P-SFH message is received, wherein the first S-SFH SP3 message comprises an SCD count field indicating a first configuration change count (CCC) associated with system configuration of an Advanced Air Interface (AAI)-SCD for a general mobile station other than the M2M device and the M2M SCD count field indicating a second CCC associated with system configuration of an AAI-SCD for the M2M device; and when the M2M SCD count field contained in the first S-SFH SP3 message indicates that the system information on the M2M device is updated, receiving and decoding, by the M2M device, a AAI-SCD message containing the updated system information for the M2M device.

4. The method of claim 3, wherein the P-SFH message is received in every superframe.

5. A machine-to-machine (M2M) device for receiving system information on the M2M device in a wireless access system supporting M2M communication, the M2M device comprising:
a radio frequency (RF) module; and
a processor configured to control reception of the system information, the processor configured to control the RF module to:
receive a first secondary superframe header subpacket3 (S-SFH SP3) message, wherein the first S-SFH SP3 message comprises a system configuration descriptor (SCD) count field indicating a first configuration change count (CCC) associated with system configuration of an Advanced Air Interface (AAI)-SCD for a general mobile station other than the M2M device and an M2M SCD count field indicating a second CCC associated with system configuration of an AAI-SCD for the M2M device, wherein the first S-SFH SP3 message comprises a S-SFH change cycle field indicating a minimum interval where content of a S-SFH is maintained and a periodicity of a M2M dedicated ranging field corresponding to two or more S-SFH change cycles, receive and decode a second S-SFH SP3 message among a plurality of transmitted S-SFH SP3 messages at only a time position determined based on periodicity information indicated by the periodicity of the M2M dedicated ranging field, when a M2M SCD count field contained in the second S-SFH SP3 message indicates that the system information on the M2M device is updated, receive and decode a AAI-SCD message containing the updated system information for the M2M device.

6. The M2M device of claim 5, wherein the periodicity information indicates the transmission period of the second S-SFH SP3 message on the basis of a superframe in which the first S-SFH SP3 message is received.

7. A machine-to-machine (M2M) device for receiving system information on the M2M device in a wireless access system supporting M2M communication, the M2M device comprising:
a radio frequency (RF) module; and
a processor configured to control reception of the system information,
the processor configured to control the RF module to:
receive a primary superframe header (P-SFH) message,
wherein the P-SFH message comprises an M2M dedicated ranging indicator indicating whether a M2M system configuration descriptor (SCD) count field contained in a first secondary superframe header sub-packet3 (S-SFH SP3) message is updated and a S-SFH change bitmap field indicating whether there is a change between the first S-SFH SP3 message and a second S SFH SP3 message which was previously transmitted,
wherein the S-SFH change bitmap field is not used by the M2M device,
when the M2M dedicated ranging indicator indicates that the M2M SCD count field is updated, receive and decode the first S-SFH SP3 message during an S-SFH change cycle in which the P-SFH message is received,
wherein the first S-SFH SP3 message comprises an SCD count field indicating a first configuration change count (CCC) associated with system configuration of an Advanced Air Interface (AAI)-SCD for a general mobile station other than the M2M device and the M2M SCD count field indicating a second CCC associated with system configuration of an AAI-SCD for the M2M device,
when the M2M SCD count field contained in the first S-SFH SP3 message indicates that the system information on the M2M device is updated,
receive and decode a AAI-SCD message containing the updated system information for the M2M device.

8. The M2M device of claim 7, wherein the P-SFH message is received in every superframe.

* * * * *